No. 705,777. Patented July 29, 1902.
J. W. McAULIFFE.
WASTE TRAP.
(Application filed May 15, 1902.)
(No Model.)

WITNESSES:
Chas. H. Luther Jr
Ada E. Fagerty

INVENTOR:
John W. McAuliffe
by Joseph A. Miller & Co.
ATTORNEYS.

UNITED STATES PATENT OFFICE.

JOHN W. McAULIFFE, OF PROVIDENCE, RHODE ISLAND.

WASTE-TRAP.

SPECIFICATION forming part of Letters Patent No. 705,777, dated July 29, 1902.

Application filed May 15, 1902. Serial No. 107,412. (No model.)

*To all whom it may concern:*

Be it known that I, JOHN W. MCAULIFFE, a citizen of the United States, residing at Providence, in the county of Providence and State of Rhode Island, have invented a new and useful Improvement in Waste-Traps, of which the following is a specification.

This invention has reference to an improvement in sanitary traps used to maintain a water seal between basins, sinks, and other fixtures and the drains with which they are connected to prevent sewer-gas from entering the building.

The object of this invention is to construct a true antisiphon sanitary trap in which the currents of the fluid flowing through the trap effect a scouring of the interior of the trap, which trap may be conveniently opened and cleaned.

To this end the invention consists in the peculiar and novel construction of the trap more fully set forth hereinafter.

Figure 1:
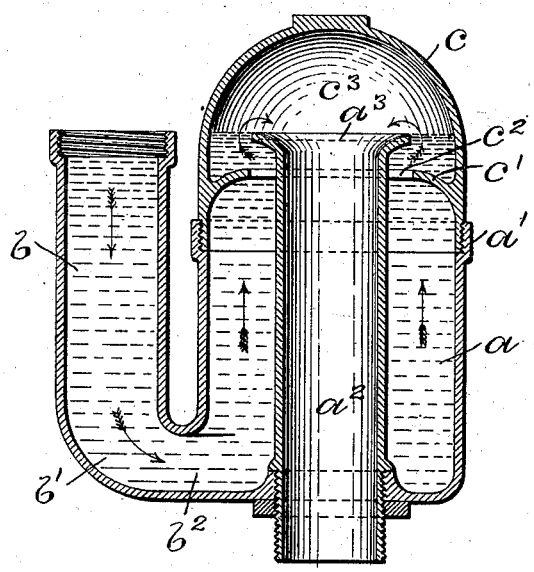
Figure 2:
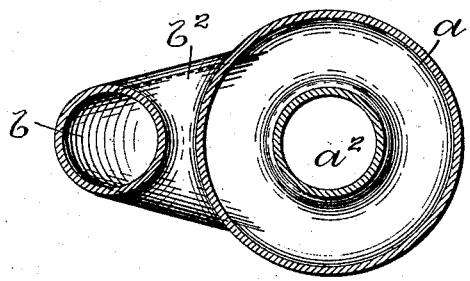

Figure 1 is a transverse vertical sectional view through the center of my improved trap, showing the direction of the fluid in its passage through the trap, (indicated by arrows.) Fig. 2 is a horizontal sectional view of the trap, showing the flaring connection of the inlet-duct with the main body of the trap.

In the drawings, $a$ indicates the preferably cylindrical main body of the trap, $a'$ the internally-screw-threaded socket of the main body, and $a^2$ the outflow-duct secured in the bottom of the main body $a$ and provided with the expanded inlet-opening $a^3$. The inlet-duct $b$ connects by the curved lower part $b'$ and the branch $b^2$ with the main body $a$. The branch $b^2$ expands laterally and connects with the main body $a$ on practically tangential lines, so as to exert a thorough scrubbing action on the bottom and an upward whirling action of the water on the inner sides of the main body.

Into the socket $a'$ the dome-shaped cap $c$ is secured, preferably by screw-thread engagement, as is shown in Fig. 1. The annular shelf $c'$ extends inward from the shell of the cap $c$. The opening $c^2$ is of sufficient size to permit the flaring of the outflow-duct $a^2$ to pass through the same.

The inlet-duct $b$ may be connected with the basin and the outflow-duct with the waste-pipe in any suitable and usual manner. When so connected and the waste water is being discharged, the water will pass down the inlet-duct $b$ with the full force of the head and such draft of the siphon as exists in the discharge-ducts, through the curved portion $b'$ and the flaring branch $b^2$, across the bottom of the trap, around the exterior of the outlet-duct, (which divides the inflowing waste water into two streams, meeting and whirling upward through the contracted opening $c^2$, formed by the annular shelf $c'$,) and then radially under and then over the edge of the expanded inlet $a^3$ of the outlet-duct $a^2$, as is clearly indicated by the arrows in Fig. 1. By this action of the waste water on the inner surface of the trap the same is being constantly scoured and maintained practically clean. The trap may be readily opened by removing the dome-shaped cap $c$, when every part is exposed and may be conveniently and thoroughly cleaned. These advantages of my improved trap are secured, while by the construction the seal and the antisiphon qualities of the trap are materially improved, by the use of the air-chamber $c^3$ in the dome of the cap $c$.

The air in the water passing through the chamber separates from the water as it passes over the edge of the expanded outflow-duct and collects in the dome $c^3$. When the flow of the water stops, the air in the air-chamber $c^3$ acts on the annular surface of the water as a cushion and materially assists in maintaining the water seal in the trap. As the head diminishes in the inlet the flow of the water through the trap is retarded by the annular shelf $c'$, so that as soon as air passes into the trap the flow will be stopped, and owing to the large quantity of water held by the body of the trap in proportion to the area of the outlet-duct $c^2$ the water cannot be lifted, but will drop back, effectually sealing the inlet and preventing the siphoning of the trap.

Having thus described my invention, I claim as new and desire to secure by Letters Patent—

1. In a waste-trap, the combination with the main body of the trap, a detachable dome-shaped upper body and an annular shelf in the detachable upper body, of a waste-duct extending from the bottom of the main body through the space inclosed by the annular shelf in the detachable upper body and having the expanded inlet-opening, as described.

2. In a waste-trap, the combination with the main body, a contracted opening in the upper part of the main body, an outflow-duct extending through the bottom of the main body and through the contracted opening in the upper part of the main body and the expanded inlet-opening of the discharge-duct, of an inlet-duct connected with the lower main body by a flaring branch, as described.

3. In a waste-trap, the combination with the inlet-duct $b$, a cylindrical main body, the flaring branch $b^2$ connecting the inlet-duct $b$ with the main body and the contracted opening $c^2$ in the main body of the outflow-duct $a^2$ and the flaring inlet-opening $a^3$, as described.

4. In a waste-trap, the combination with the lower main body $a$, the dome-shaped cap $c$, means for connecting and disconnecting the cap from the main body, the annular shelf $c^2$ in the cap, the inlet-duct $b$ and the flaring branch connecting the inlet-duct with the main body of the outlet-duct $a^2$ and the flaring inlet-opening $a^3$ of the same, located above the annular shelf within the dome-shaped cap, as described.

In testimony whereof I have signed my name to this specification in the presence of two subscribing witnesses.

JOHN W. McAULIFFE.

Witnesses:
J. A. MILLER, Jr.,
ADA E. HAGERTY.